(12) United States Patent
Lee et al.

(10) Patent No.: US 12,514,350 B2
(45) Date of Patent: Jan. 6, 2026

(54) CONTACT LENS PACKAGING CONTAINER AND CONTACT LENS PRODUCT

(71) Applicant: PEGAVISION CORPORATION, Taoyuan (TW)

(72) Inventors: Tsung-Yang Lee, Taoyuan (TW); Wei-An Yeh, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 539 days.

(21) Appl. No.: 17/946,004

(22) Filed: Sep. 15, 2022

(65) Prior Publication Data

US 2023/0371668 A1 Nov. 23, 2023

(51) Int. Cl.
*A45C 11/00* (2006.01)

(52) U.S. Cl.
CPC .................................. *A45C 11/005* (2013.01)

(58) Field of Classification Search
CPC .............. B65D 2585/545; B65D 81/30; B65D 75/326; A45C 11/005
See application file for complete search history.

(56) References Cited

U.S. PATENT DOCUMENTS

| | | |
|---|---|---|
| 2002/0197478 A1 | 12/2002 | Muggli et al. |
| 2004/0180160 A1 | 9/2004 | Stevenson |
| 2005/0205451 A1* | 9/2005 | Brown-Skrobot ... C08K 5/0041 206/438 |
| 2008/0011619 A1 | 1/2008 | Newman |
| 2019/0046353 A1 | 2/2019 | Greenwood et al. |
| 2020/0073145 A1 | 3/2020 | Frutiger et al. |
| 2020/0189823 A1* | 6/2020 | Ho ............................ C08K 5/20 |
| 2020/0407324 A1 | 12/2020 | Mahadevan et al. |
| 2021/0181379 A1 | 6/2021 | Zheng et al. |
| 2023/0113243 A1* | 4/2023 | Gooch ................. A45C 11/005 206/5.1 |
| 2023/0203313 A1 | 6/2023 | Golchert et al. |

FOREIGN PATENT DOCUMENTS

| | | |
|---|---|---|
| CN | 1960915 A | 5/2007 |
| CN | 101516739 A | 8/2009 |
| CN | 203490432 U | 3/2014 |
| CN | 108697216 A | 10/2018 |
| CN | 109423031 A | 3/2019 |
| CN | 113195377 A | 7/2021 |
| JP | 2000255642 A | 9/2000 |
| JP | 2007529379 A | 10/2007 |

(Continued)

OTHER PUBLICATIONS

Eyes Explained, "Contact lens habits you NEED to have | Optometrist Explains", May 27, 2020, XP093076193, https://www.youtube.com/watch?v=iLw_TAmON3l&ab_channel=EyesExplained.

*Primary Examiner* — Michael C Miggins (74) *Attorney, Agent, or Firm* — Li & Cai Intellectual Property Office (57) ABSTRACT

A contact lens packaging container and a contact lens product are provided. The contact lens packaging container is formed by a plastic material and a color powder material dispersed in the plastic material. The contact lens packaging container has a light blocking rate of not less than 20% under a wavelength measurement range between 380 nanometers and 780 nanometers through a spectrophotometer.

11 Claims, 5 Drawing Sheets

(56) References Cited

FOREIGN PATENT DOCUMENTS

| | | |
|---|---|---|
| TW | I250934 B | 3/2006 |
| TW | 201406844 A | 2/2014 |
| TW | 202018379 A | 5/2020 |
| TW | 202114993 A | 4/2021 |
| TW | 202128052 A | 8/2021 |
| WO | WO2020121223 A1 | 6/2020 |
| WO | WO2021250052 A1 | 12/2021 |

* cited by examiner

CONTACT LENS PACKAGING CONTAINER AND CONTACT LENS PRODUCT

CROSS-REFERENCE TO RELATED PATENT APPLICATION

This application is the U.S. national stage of International Application PCT/CN2022/094434, filed on May 23, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference is individually incorporated by reference.

FIELD OF THE DISCLOSURE

The present disclosure relates to a contact lens packaging container, and more particularly to a contact lens packaging container and a contact lens product.

BACKGROUND OF THE DISCLOSURE

In the related art, a conventional contact lens packaging container is made of a colorless plastic material, so that the conventional contact lens packaging container has a colorless and transparent appearance that is dull in appearance and lacks variety in terms of color.

Furthermore, the conventional contact lens packaging container is not capable of blocking any special types of light, so that a range of application for the product is relatively limited.

SUMMARY OF THE DISCLOSURE

In response to the above-referenced technical inadequacies, the present disclosure provides a contact lens packaging container and a contact lens product.

In one aspect, the present disclosure provides a contact lens packaging container. The contact lens packaging container is formed by a plastic material and a color powder material dispersed in the plastic material. The contact lens packaging container has a light blocking rate of not less than 20% under a wavelength measurement range between 380 nanometers and 780 nanometers through a spectrophotometer.

In certain embodiments, the light blocking rate of the contact lens packaging container is defined by a formula:

$$\text{light blocking rate\%} = \left| \left( \frac{T(\text{color}) - T(\text{colorless})}{T(\text{colorless})} \right) \right| * 100\%.$$

In certain embodiments, T(color) is an average light transmittance of the contact lens packaging container with the color powder material, and T(colorless) is an average light transmittance of a colorless packaging container without the color powder material.

In certain embodiments, T(color) is between 5% and 50%, T(colorless) is between 40% and 70%, and the light blocking rate is between 20% and 85%.

In certain embodiments, the contact lens packaging container has a container thickness of between 0.4 mm and 1.2 mm.

In certain embodiments, the contact lens packaging container has the container thickness of between 0.6 mm and 1.0 mm.

In certain embodiments, the plastic material is at least one of polyethylene (PE), polypropylene (PP), polystyrene (PS) and poly (methyl methacrylate) (PMMA).

In certain embodiments, a mass percent concentration of the color powder material in the contact lens packaging container is not less than 50 ppm and not greater than 0.3 wt %.

In certain embodiments, a mass percent concentration of the plastic material in the contact lens packaging container is not less than 80 wt %.

In certain embodiments, the color of the color powder material is at least one of yellow, orange, red, magenta, purple, pink, blue and green.

In certain embodiments, the color powder material is at least one material selected from a group consisting of benzimidazolone pigment, diketopyrrolopyrrole pigment, isoindolinone pigment, condensed azo pigment, disazo pigment, quinacridone pigment, copper phthalocyanine pigment, halogenated copper phthalocyanine pigment, and anthraquinone pigment.

In certain embodiments, the color of the contact lens packaging container is yellow, orange, red, blue, or black; in which a container thickness of the contact lens packaging container is between 0.6 mm and 1.0 mm, and the contact lens packaging container has the light blocking rate of between 20% and 85% under the wavelength measurement range between 380 nanometers and 780 nanometers through the spectrophotometer.

In another aspect, the present disclosure provides a contact lens product. The contact lens product includes a contact lens packaging container, a buffer solution, and a contact lens. The contact lens packaging container is formed by a plastic material and a color powder material dispersed in the plastic material. The contact lens packaging container has a light blocking rate of not less than 20% under a wavelength measurement range between 380 nanometers and 780 nanometers through a spectrophotometer. The buffer solution is filled in the contact lens packaging container. The contact lens is placed in the contact lens packaging container and soaked in the buffer solution. The contact lens product further includes an active ingredient that is present in the buffer solution and/or the contact lens, and the active ingredient is surrounded by the contact lens packaging container.

In certain embodiments, the light blocking rate of the contact lens packaging container is defined by a following formula:

$$\text{light blocking rate\%} = \left| \left( \frac{T(\text{color}) - T(\text{colorless})}{T(\text{colorless})} \right) \right| * 100\%.$$

In certain embodiments, T(color) is an average light transmittance of the contact lens packaging container with the color powder material, and T(colorless) is an average light transmittance of a colorless packaging container without the color powder material. T(color) is between 5% and 50%, T(colorless) is between 40% and 70%, and the light blocking rate is between 20% and 85%.

In certain embodiments, the active ingredient is at least one material selected from a group consisting of vitamin ingredient, phytochemical ingredient, naturally derived ingredient, and biologically active ingredient.

Therefore, in the contact lens packaging container and the contact lens product provided by the present disclosure, by virtue of "the contact lens packaging container being formed by a plastic material and a color powder material dispersed in the plastic material" and "the contact lens packaging container having a light blocking rate of not less than 20% under a wavelength measurement range between 380 nanometers and 780 nanometers through a spectrophotometer," the contact lens packaging container can have a variety of colors and can block light within a specific wavelength.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Contact Lens Packaging Container

Figure 1:
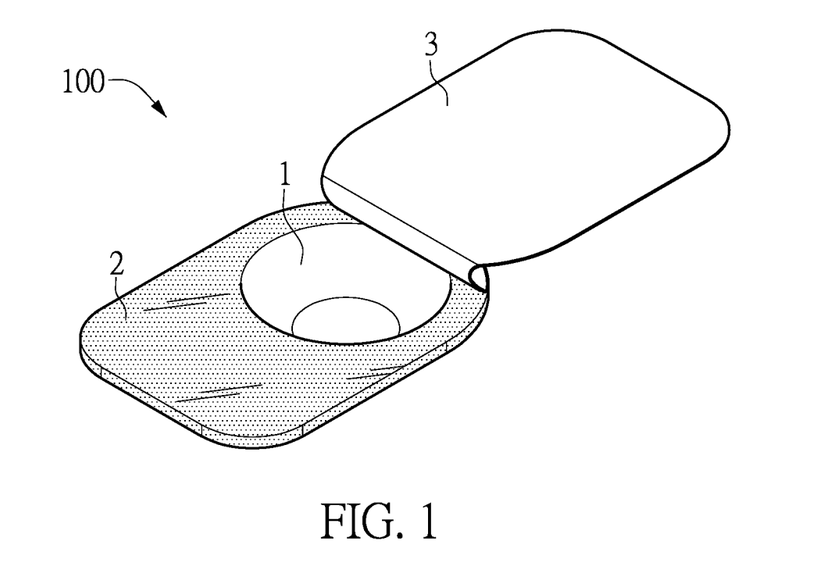
FIG. 1 is a perspective view of a contact lens packaging container according to one embodiment of the present disclosure.
Figure 2:
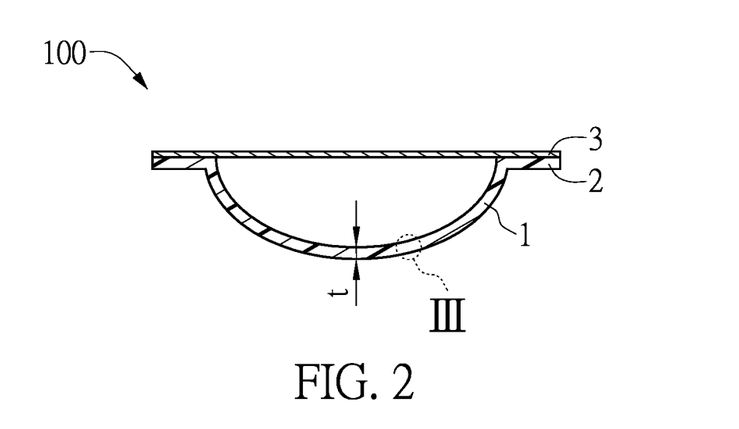
FIG. 2 is a cross-sectional view of the contact lens packaging container according to one embodiment of the present disclosure.

Referring to FIG. 1 and FIG. 2, an embodiment of the present disclosure provides a contact lens packaging container 100. The contact lens packaging container 100 has a containing portion 1, a surrounding portion 2 and a packaging portion 3. The containing portion 1 is concaved and used for containing a contact lens and a buffer solution. The surrounding portion 2 is flat and integrally formed around the containing portion 1. The packaging portion 3 is a packaging film used to package the contact lens and the buffer solution in the containing portion 1. It is worth mentioning that the contact lens packaging container 100 of the present embodiment can have colorful colors and can block light within a specific wavelength.

Figure 3:
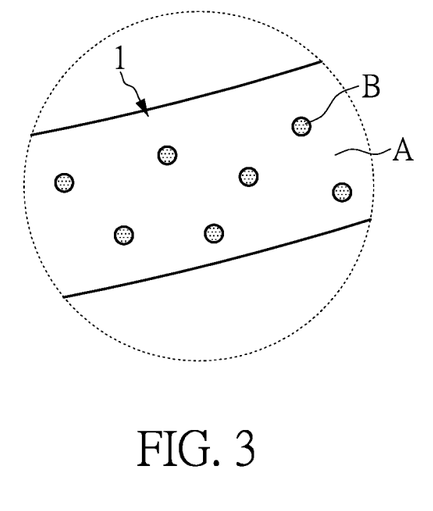
FIG. 3 is a partially enlarged view of region III in FIG. 2.

Referring to FIG. 3, the contact lens packaging container 100 is formed by a plastic material A and a color powder material B dispersed in the plastic material A. In particular, the containing portion 1 and the surrounding portion 2 of the contact lens packaging container 100 are formed by the plastic material A and the color powder material B dispersed in the plastic material A.

The contact lens packaging container 100 has a special optical property. That is, the contact lens packaging container 100 has a light blocking rate of not less than 20% under a wavelength measurement range between 380 nanometers and 780 nanometers through a spectrophotometer.

Based on the abovementioned special optical property, the contact lens packaging container 100 can have colorful colors and can block light within a specific wavelength.

More specifically, the light blocking rate of the contact lens packaging container 100 is defined by a following formula:

$$\text{light blocking rate\%} = \left| \left( \frac{T(\text{color}) - T(\text{colorless})}{T(\text{colorless})} \right) \right| * 100\%.$$

Among them, T(color) is an average light transmittance of the contact lens packaging container with the color powder material, and T(colorless) is an average light transmittance of a colorless packaging container without the color powder material. Light transmittance %=(I/I0)*100%, in which I0 is an incident light intensity, and I is an outgoing light intensity.

Figure 4:
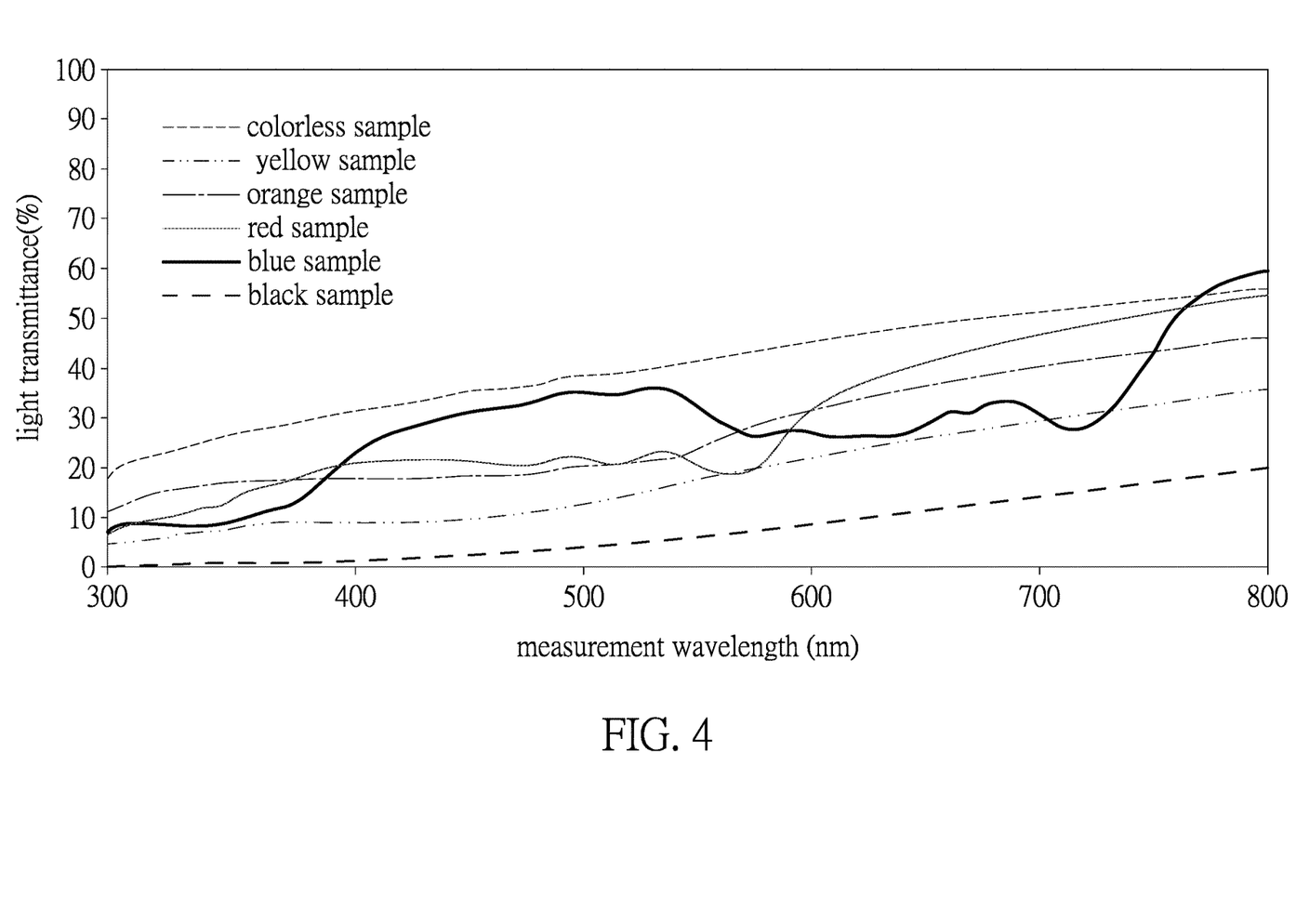
FIG. 4 is a diagram showing light transmittance curves of various contact lens packaging containers according to the embodiment of the present disclosure.

It should be noted that the "average light transmittance" mentioned in the present application is obtained through the following manner a contact lens packaging container is measured by a spectrophotometer under a wavelength measurement range between 380 nanometers and 780 nanometers for different wavelengths (i.e., 380 nanometers, 400 nanometers, and so on, until 780 nanometers) to obtain a light transmittance curve (as shown in FIG. 4), and the average light transmittance is obtained by taking an arithmetic mean of the light transmittance curve.

In addition, the above-mentioned colorless packaging container without the color powder material refers to a generally colorless and transparent packaging container, which has high light transmittance and is dull and lacks variety in terms of color change. That is, the light blocking rate mentioned herein is a result obtained by comparing and calculating the light transmittances of the color packaging container with the color powder material and the colorless packaging container without the color powder material.

In some embodiments of the present disclosure, the average light transmittance T(color) of the contact lens packaging container with the color powder material is between 5% and 50%, and preferably between 5% and 35%. The average light transmittance T(colorless) of the colorless packaging container without the color powder material is between 40% and 70%, and preferably between 40% and 60%. Furthermore, the light blocking rate is not less than 20%, and preferably between 20% and 85%.

Therefore, the contact lens packaging container with the color powder material in the present embodiment can protect an active ingredient stored therein under certain transparency conditions. It is worth mentioning that the contact lens packaging container of the present embodiment still maintains a certain degree of transparency, in order to allow a user or a detection instrument to view or detect the contact lens and the buffer solution stored therein.

If a value of the light blocking rate or T(color) exceeds the above-mentioned numerical range, the contact lens packaging container may not be able to protect the active ingredient stored therein (i.e., the light blocking rate is less than 20%). Conversely, the contact lens and the buffer solution stored in the contact lens packaging container may not be observable by the user or the detection instrument (i.e., when T(color) is less than 5%).

A container thickness t of the contact lens packaging container 100 will affect the light blocking rate (as shown in FIG. 2).

In some embodiments of the present disclosure, a container thickness t of the contact lens packaging container 100 is between 0.4 mm (millimeter) and 1.2 mm. Preferably, a container thickness t of the contact lens packaging container 100 is between 0.6 mm and 1.0 mm.

If the container thickness of the contact lens packaging container is too thin (i.e., less than 0.4 mm), the light blocking rate may be too low to have a protective effect on the active ingredient. In addition, the contact lens packaging container may be easily deformed when being squeezed as a result of the container thickness being too thin, thereby affecting an appearance of the contact lens packaging container.

If the container thickness of the contact lens packaging container is too thick (i.e., greater than 1.2 mm), the light blocking rate may be too high, so that the contact lens and the buffer solution stored in the contact lens packaging container cannot be observed by the user or the detection instrument.

In terms of material type of the plastic material, the plastic material is at least one material selected from a group consisting of polyethylene (PE), polypropylene (PP), polystyrene (PS), and poly(methyl methacrylate) (PMMA), but the present disclosure is not limited thereto. As long as the plastic material can be used to form a contact lens packaging container that is light-transmissive and can be used to store a contact lens and a buffer solution, the plastic material should fall within the scope of the present disclosure.

In terms of content range of the plastic material, a mass percent concentration of the plastic material in the contact lens packaging container is not less than 80 wt %, and preferably not less than 90 wt %. That is, the plastic material is the main matrix material for forming the packaging container.

In terms of material type of the color powder material, the color powder material is at least one material selected from a group consisting of benzimidazolone pigment, diketopyrrolopyrrole pigment, isoindolinone pigment, condensed azo pigment, disazo pigment, quinacridone pigment, copper phthalocyanine pigment, halogenated copper phthalocyanine pigment, and anthraquinone pigment, but the present disclosure is not limited thereto. As long as the material type of the color powder material can be used to add color to the contact lens packaging container and improve the light blocking rate, the color powder material should fall within the scope of the present disclosure.

The content range of the color powder material will affect the light blocking rate and T(color). In some embodiments of the present disclosure, a mass percent concentration of the color powder material in the contact lens packaging container is not less than 50 ppm and not greater than 0.3 wt %. If the content range of the color powder material is too low (i.e., less than 50 ppm), the light blocking rate will be too low to have a protective effect on the active ingredient.

On the contrary, if the content range of the color powder material is too high (i.e., greater than 0.3 wt %), the light blocking rate will be too high (or T(color) will be too low), so that the contact lens and the buffer solution stored in the contact lens packaging container cannot be observed by the user or the detection instrument.

In some embodiments of the present disclosure, the color of the color powder material is at least one of yellow, orange, red, magenta, purple, pink, blue, and green, but the present disclosure is not limited thereto.

The color powder material can be added into the plastic material in a single color, or can also be added into the plastic material in two or more colors, so that the packaging container can have different colors such as yellow, orange, red, blue, or black.

In some embodiments of the present disclosure, the color of the contact lens packaging container is yellow, orange, red, blue, or black. A container thickness of the contact lens packaging container 100 is between 0.6 mm and 1.0 mm, and the contact lens packaging container 100 has a light blocking rate of between 20% and 85% under the wavelength measurement range between 380 nanometers and 780 nanometers through the spectrophotometer.

More specifically, as shown in FIG. 4, FIG. 4 shows measured light transmittance curves (% T) of contact lens packaging containers with different colors that are measured by a spectrophotometer under a wavelength measurement range of between 380 nanometers and 780 nanometers. Table 1 shows different average light transmittances and light blocking rates respectively calculated according to the light transmittance curves of the contact lens packaging containers with different colors in FIG. 4.

TABLE 1

|  | colorless sample | yellow sample | orange sample | red sample | blue sample | black sample |
|---|---|---|---|---|---|---|
| average light transmittance | 43.6% | 20.2% | 29.4% | 32.1% | 31.7% | 8.4% |
| light blocking rate | — | 53.7% | 32.6% | 26.4% | 27.3% | 80.7% |

The average light transmittance of the colorless sample with a sample thickness range of 0.8 mm is 43.6%, is as calculated from the light transmittance curve (% T) that is measured by the spectrophotometer in the wavelength range between 380 nm and 780 nm. The colorless sample is a colorless transparent polypropylene packaging container without any color powder material.

The average light transmittance of the yellow sample with a sample thickness range of 0.8 mm is 20.2%, is as calculated from the light transmittance curve (% T) that is measured by the spectrophotometer in the wavelength range of 380 nm to 780 nm. Furthermore, the light blocking rate of the yellow sample is 53.7%. The material of the color powder material used in the yellow sample is isoindolinone pigment, the addition amount of the color powder material is 0.015 wt %, and the plastic material used is polypropylene.

The average light transmittance of the orange sample with a sample thickness range of 0.8 mm is 29.4%, is as calculated from the light transmittance curve (% T) that is measured by the spectrophotometer in the wavelength range of 380 nm to 780 nm. In addition, the light blocking rate of the orange sample is 32.6%. The material type of the color powder material used in the orange sample is benzimidazolone pigment, the addition amount of the color powder material is 0.015 wt %, and the plastic material used is polypropylene.

The average light transmittance of the red sample with a sample thickness range of 0.8 mm is 32.1%, is as calculated from the light transmittance curve (% T) that is measured by the spectrophotometer in the wavelength range of 380 nm to 780 nm. In addition, the light blocking rate of the red sample is 26.4%. The material type of the color powder material used in the red sample is diketopyrrolopyrrole pigment, the addition amount of the color powder material is 0.015 wt %, and the plastic material used is polypropylene.

The average light transmittance of the blue sample with a sample thickness range of 0.8 mm is 31.7%, is as calculated from the light transmittance curve (% T) that is measured by the spectrophotometer in the wavelength range of 380 nm to 780 nm. In addition, the light blocking rate of the blue sample is 27.3%. The material type of the color powder material used in the blue sample is copper phthalocyanine pigment, the addition amount of the color powder material is 0.015 wt %, and the plastic material used is polypropylene.

The average light transmittance of the black sample with a sample thickness range of 0.8 mm is 8.4%, is as calculated from the light transmittance curve (% T) that is measured by the spectrophotometer in the wavelength range of 380 nm to 780 nm. In addition, the light blocking rate of the black sample is 80.7%. The materials of the color powder material used in the black sample are isoindolinone pigment, benzimidazolone pigment, diketopyrrolopyrrole pigment, copper phthalocyanine pigment, and halogenated copper phthalocyanine pigment. The addition amount of the color powder material is 0.075 wt % (each of the above five color powder materials is added in an amount of 0.015 wt %, so that the total addition amount is 0.075 wt %). The plastic material used is polypropylene.

As shown in FIG. 4, more specific features of the packaging containers with different colors are described below.

Both the yellow polypropylene packaging container and the orange polypropylene packaging container have light blocking rates of not less than 50% from 380 nm and 495 nm when the sample thickness ranges from 0.8 mm and the spectrophotometer measures the wavelength range from 380 nm to 780 nm.

The red polypropylene packaging container has a light blocking rate of not less than 50% from 495 nm to 570 nm when the sample thickness ranges from 0.8 mm and the spectrophotometer measures the wavelength range from 380 nm to 780 nm.

The blue polypropylene packaging container has a light blocking rate of not less than 50% from 570 nm to 730 nm when the sample thickness ranges from 0.8 mm and the spectrophotometer measures the wavelength range from 380 nm to 780 nm.

The black polypropylene packaging container has a light blocking rate of not less than 80% from 380 m to 780 nm when the sample thickness ranges from 0.8 mm and the spectrophotometer measures the wavelength range from 380 nm to 780 nm.

Contact Lens Product

Figure 5:
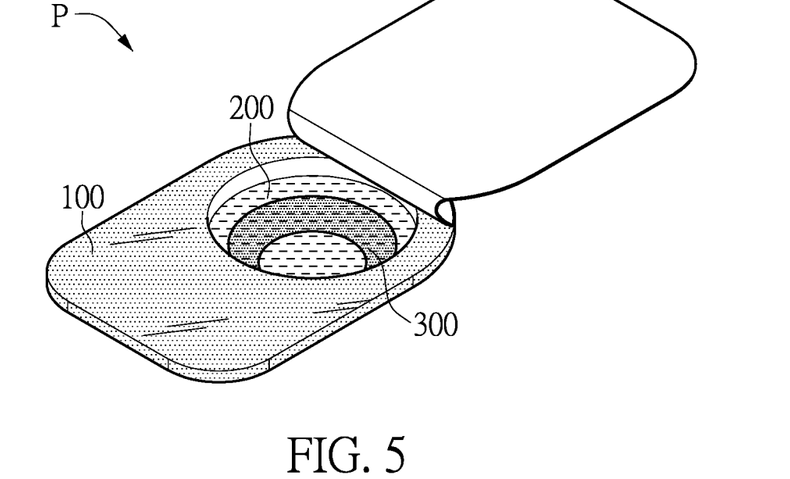
FIG. 5 is a perspective view of a contact lens product according to the embodiment of the present disclosure.
Figure 6:
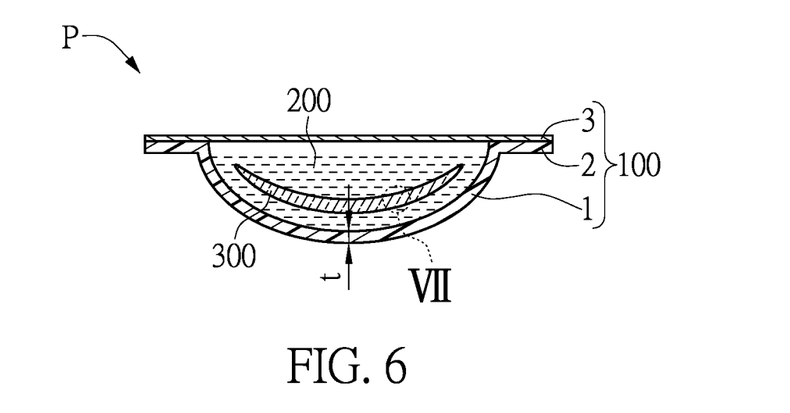
FIG. 6 is a cross-sectional view of the contact lens product according to the embodiment of the present disclosure.

As shown in FIG. 5 and FIG. 6, one embodiment of the present disclosure provides a contact lens product P. The contact lens product P includes a contact lens packaging container 100, a buffer solution 200, and a contact lens 300.

The contact lens packaging container 100 is formed by a plastic material A and a color powder material B dispersed in the plastic material A. The contact lens packaging container 100 has a light blocking rate of not less than 20% under a wavelength measurement range between 380 nanometers and 780 nanometers through a spectrophotometer. The features related to the light blocking rate of the contact lens packaging container 100 have been described above, and will not be repeated herein.

The buffer solution 200 is filled in the contact lens packaging container 100 to adjust a pH value and an osmotic pressure therein. In terms of material types, the buffer solution 200 can be, for example, a borate-based buffer solution or a phosphate-based buffer solution.

A composition of the borate-based buffer solution includes water (also referred to as a balance), and further includes sodium chloride and borate that are dispersed in the water. The borate is at least one material selected from a group consisting of boric acid and sodium tetraborate.

A composition of the phosphate-based buffer solution includes water (also referred to as a balance), and further includes sodium chloride and phosphate that are dispersed in water. The phosphate is at least one material selected from a group consisting of sodium monohydrogen phosphate, sodium dihydrogen phosphate, potassium monohydrogen phosphate, and potassium dihydrogen phosphate.

The contact lens 300 is placed in the contact lens packaging container 100 and soaked in the buffer solution 200. The material of the contact lens 300 can be, for example, silicone hydrogel, which can improve the oxygen permeability of the contact lens and avoid symptoms such as red eye, bloodshot eyes, and redness caused by corneal hypoxia. Alternatively, the material of the contact lens 300 may also be a hydrogel, which can improve the wettability and lubricity of the contact lens, thereby increasing the comfort of a user.

Figure 7:
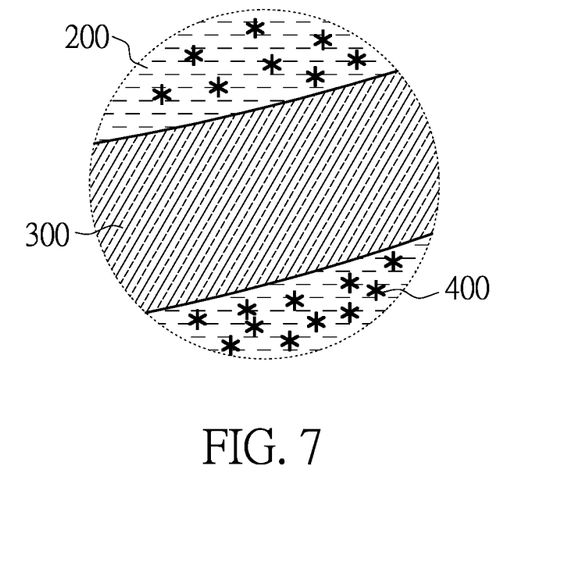
FIG. 7 is a partially enlarged view of region VII in FIG. 6.
Figure 8:
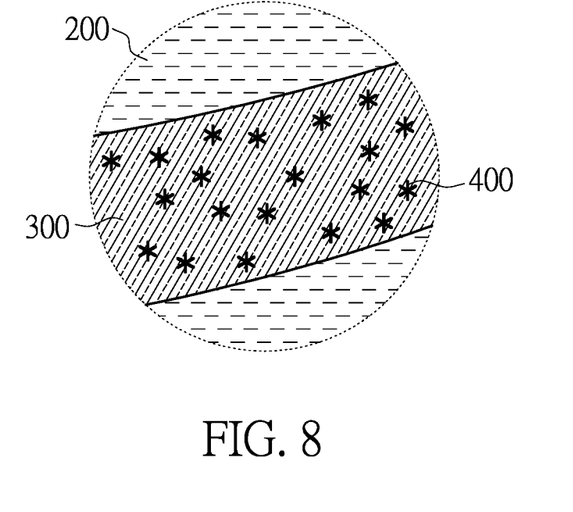
FIG. 8 is a schematic view of a variation of FIG. 7.

The contact lens product further includes an active ingredient 400, which is present in the buffer solution 200 (as shown in FIG. 7) and/or in a lens body of the contact lens 300 (as shown in FIG. 8).

The active ingredient 400 is at least one material selected from a group consisting of a vitamin ingredient, a phytochemical ingredient, a naturally derived ingredient, and a biologically active ingredient.

Based on the special optical properties of the contact lens packaging container 100, the contact lens packaging container 100 can protect the active ingredient 400 (e.g., a light sensitive substance) stored therein, and avoid or effectively reduce the deterioration of the active ingredient 400.

Method For Producing Contact Lens Packaging Container

One embodiment of the present disclosure provides a method for producing a contact lens packaging container. It should be noted that while the above-mentioned contact lens packaging container of the embodiment of the present disclosure can be produced by the present method, it can also be produced by other manufacturing methods, and the present disclosure is not limited to the present method.

The method for producing the contact lens packaging container includes performing a mixing step and performing a molding step. The mixing step includes mixing a plastic material and a color powder material with each other and introducing them into a screw of an injection machine to form a mixed material. The molding step includes filling the mixed material into a mold cavity for forming, and cooling and solidifying the mixed material to form a contact lens packaging container, in which the contact lens packaging container has a light blocking rate of not less than 20% under a wavelength measurement range between 380 nanometers and 780 nanometers through a spectrophotometer.

More specifically, the above-mentioned method for producing the contact lens packaging container can be classified into dispersing the color powder material into the plastic material by one-time dispersion or multiple-time dispersion.

In a first embodiment of the present disclosure (a one-time dispersion of the color powder material), the mixing step includes: putting a plastic material (i.e., polypropylene colloidal particles) having 50 ppm to 0.3 wt % of one or more kinds of color powder material added therein into a mixer for mixing, and then putting them into a screw of an injection machine for a first-time dispersive mixing to form a mixed material. A processing temperature of the mixed material is between 170° C. and 240° C. The molding step includes filling the mixed material into a mold cavity for forming, and cooling and solidifying the mixed material to form a contact lens packaging container. That is, in the first embodiment, the packaging container is directly made of the color powder material and the plastic material.

In a second embodiment of the present disclosure (a multiple-time dispersion of the color powder material), the mixing step includes putting a plastic material (i.e., polypropylene colloidal particles) having 50 ppm to 0.3 wt % of one or more kind of color powder material and 0.05 wt % to 0.3 wt % of an antioxidant added therein into a rotary mixer for a first-time dispersive mixing; and putting the mixture into a screw extruder for a second-time dispersive mixing so as to form a mixed material. A processing temperature of the mixed material is between 170° C. and 240° C. A material strip after a mixing reaction is cooled by water, and the material strip is granulated by a pelletizer to obtain dyed polypropylene colloidal particles. The molding step includes putting the dyed polypropylene colloidal particles into a screw of an injection machine (a screw temperature is between 170° C. and 240° C.); and performing a third-time dispersive mixing, and then filling the mixed material into a mold cavity for forming, and cooling and solidifying the mixed material to form a contact lens packaging container. That is, in the second embodiment, the color powder material is firstly granulated, and then fabricated into a packaging container.

Beneficial Effects of the Embodiments

In conclusion, in the contact lens packaging container and the contact lens product provided by the present disclosure, by virtue of "the contact lens packaging container being formed by a plastic material and a color powder material dispersed in the plastic material" and "the contact lens packaging container having a light blocking rate of not less than 20% under a wavelength measurement range between 380 nanometers and 780 nanometers through a spectrophotometer," the contact lens packaging container can have a variety of colors and can block light within a specific wavelength.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A contact lens packaging container, comprising:
a containing portion that is configured to contain contact lens and is formed by a plastic material and a color powder material dispersed in the plastic material;
wherein the containing portion of the contact lens packaging container has a light blocking rate under a wavelength measurement range between 380 nanometers and 780 nanometers through a spectrophotometer;
wherein the light bis rate is defined by a formula:

$$\text{light blocking rate\%} = \left|\left(\frac{T(\text{color}) - T(\text{colorless})}{T(\text{colorless})}\right)\right| * 100\%;$$

wherein T(color) is an average light transmittance of the contact lens packaging container with the color powder material, and T(colorless) is an average light transmittance of a colorless, packaging container without the color powder material;
wherein T(color) is between 5% and 50%, T(colorless) is between 40% and 70%, and the light blocking rate is between 20% and 85%.

2. The contact lens packaging container according to claim 1, wherein the plastic material is at least one of polyethylene (PE), polypropylene (PP), polystyrene (PS), and poly(methyl methacrylate) (PMMA).

3. The contact lens packaging container according to claim 1, wherein a mass percent concentration of the color powder material in the contact lens packaging container is not less than 50 ppm and not greater than 0.3 wt %.

4. The contact lens packaging container according to claim 1, wherein a mass percent concentration of the plastic material in the contact lens packaging container is not less than 80 wt %.

5. The contact lens packaging container according to claim 1, wherein a color of the color powder material is at least one of yellow, orange, red, magenta, purple, pink, blue, and green.

6. The contact lens packaging container according to claim 1, wherein the color powder material is at least one material selected from a group consisting of benzimidazolone pigment, diketopyrrolopyrrole pigment, isoindolinone pigment, condensed azo pigment, disazo pigment, quinacridone pigment, copper phthalocyanine pigment, halogenated copper phthalocyanine pigment, and anthraquinone pigment.

7. The contact lens packaging container according to claim 1, wherein a color of the contact lens packaging container is yellow, orange, red, blue, or black; wherein a container thickness of the contact lens packaging container is between 0.6 mm and 1.0 mm, and the contact lens packaging container has the light blocking rate of between 20% and 85% under the wavelength measurement range between 380 nanometers and 780 nanometers through the spectrophotometer.

8. The contact lens packaging container according to claim 1, wherein the contact lens packaging container has a container thickness of between 0.4 mm and 1.2 mm.

9. The contact lens packaging container according to claim 8, wherein the contact lens packaging container has the container thickness of between 0.6 mm and 1.0 mm.

10. A contact lens product, comprising:
 a contact lens packaging container including on configured to contain a contact lens and formed by a plastic material and a color powder material dispersed in the plastic material; wherein the containing portion of the contact lens packaging container has a light blocking rate under a wavelength measurement range between 380 nanometers and 780 nanometers through a spectrophotometer;
 wherein the light blocking rate is defined by a formula:

$$\text{light blocking rate\%} = \left| \left( \frac{T(\text{color}) - T(\text{colorless})}{T(\text{colorless})} \right) \right| * 100\%;$$

wherein T(color) is an average light transmittance for the contact lens packaging container with the color powder material and T(colorless) is an average light transmittance of a colorless packaging container without the color powder material; wherein T(color) is between 5% and 50%, T(colorless) is between 40% and 70%, and the light blocking rate is between 20% and 85%,
 a buffer solution filled in the contact lens packaging container; and
 a contact lens placed in the contact lens packaging container and soaked in the buffer solution;
 wherein the contact lens product further comprises an active ingredient that is present in the buffer solution and/or the contact lens, and the active ingredient is surrounded by the contact lens packaging container.

11. The contact lens product according to claim 10, wherein the active ingredient is at least one material selected from a group consisting of a vitamin ingredient, a phytochemical ingredient, a naturally derived ingredient, and a biologically active ingredient.

\* \* \* \* \*